United States Patent [19]

Fletcher et al.

[11] Patent Number: 4,478,377
[45] Date of Patent: Oct. 23, 1984

[54] AIRCRAFT

[75] Inventors: James Fletcher, Preston; Michael S. Wooding, Lytham St. Anne's, both of England

[73] Assignee: British Aerospace Public Limited Company, London, England

[21] Appl. No.: 329,137

[22] Filed: Dec. 9, 1981

[30] Foreign Application Priority Data

Dec. 22, 1980 [GB] United Kingdom ............. 8041042

[51] Int. Cl.³ .............................................. B64D 33/04
[52] U.S. Cl. ..................................... 244/12.5; 244/55; 244/130
[58] Field of Search ............... 244/12.1, 12.4, 12.5, 244/13, 15, 23 R, 23 A, 23 B, 23 D, 45 R, 45 A, 52, 54, 55, 56, 73 R, 119, 130, 198, 53 B

[56] References Cited

U.S. PATENT DOCUMENTS

| 3,271,948 | 9/1966 | Fuller | 244/52 |
| 3,416,754 | 12/1968 | Pinaire et al. | 244/55 |
| 3,578,265 | 5/1971 | Patierno et al. | 244/198 |
| 4,343,446 | 8/1982 | Langley | 244/15 |

FOREIGN PATENT DOCUMENTS 804835 1/1969 Canada .
1347358 11/1963 France .

OTHER PUBLICATIONS

*Jane's All the World's Aircraft* 1958-1959, pp. 92 adv. and 84, "Handley Page Victor Aircraft".

Primary Examiner—Trygve M. Blix
Assistant Examiner—Rodney Corl
Attorney, Agent, or Firm—Cushman, Darby & Cushman

[57] ABSTRACT

An aircraft includes an aircraft body portion 10, a wing portion 14 attached to the body portion by means of an intermediate portion 15 whose thickness diminishes outboard of the body portion to blend with the wing portion. The intermediate portion 15 comprises upper and lower surfaces diverging rearwardly from a leading region to a region of maximum divergence. The aft portion of the intermediate region is cut away to receive propulsion jet outlet 16 which is shaped to be within a rearward projection of the region of maximum divergence of the intermediate portion. The propulsion outlet jet 16 may be directed downwardly to generate a lift component.

10 Claims, 6 Drawing Figures

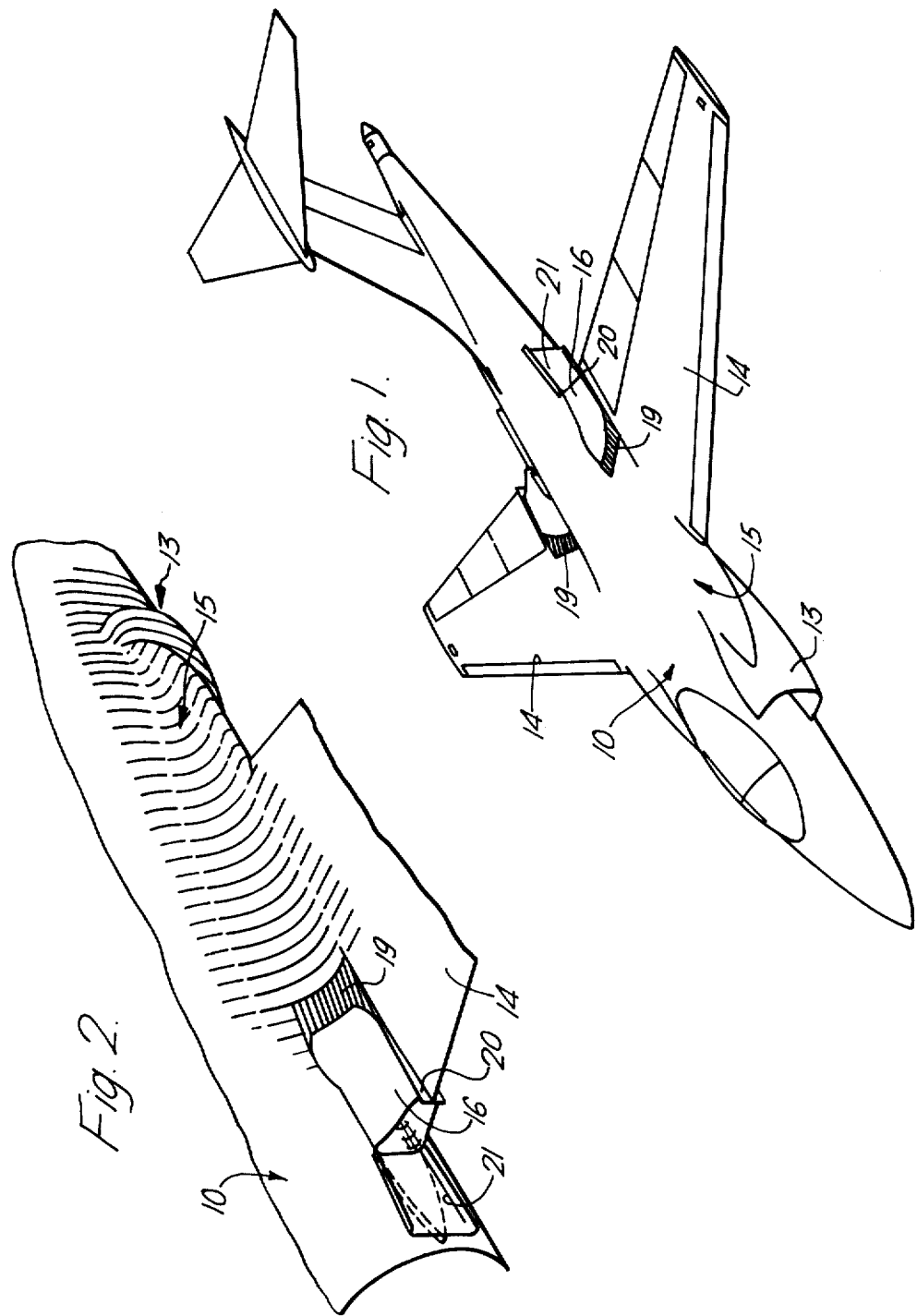

AIRCRAFT

This invention relates to jet propelled aircraft and particularly, although not exclusively, to those having movable jet propulsion outlets which can be directed generally rearwardly for propulsion purposes, generally downwardly for lift purposes, or at some intermediate position for both lift and propulsion purposes.

It is found that where the jet propulsion outlets protrude from the aircraft body or wing contour, that is particularly so where the outlets are adapted for swivelling, not unnaturally these proturberances create relatively high drag even when in the aft directed position, and give rise to certain adverse interference effects.

An object of this invention is to reduce these drag and interference effects. Accordingly, if some drag reduction can be achieved or vertical lift can be increased then the aircraft can fly further, carry a heavier payload, or a combination of both, assuming the same powerplant thrust.

Any references in this Specification to direction such as up, down, forwards, rearwards and so on, relate to an aircraft when in a straight and level flight attitude.

According to one aspect of this invention, there is provided an aircraft including a body portion, a wing portion, an intermediate portion, a powerplant and propulsion jet outlet means, said intermediate portion connecting the wing portion to one side of the body portion and diminishing in thickness outboard of the body portion, said intermediate portion having an upper and a lower surface region diverging rearwardly from a leading region to a region of maximum divergence, said powerplant being housed within the body portion for generating a flow of propulsion fluid, said propulsion jet outlet means being arranged to receive and exhaust propulsion fluid generated by the powerplant and shaped to lie substantially within a rearward projection of the region of maximum divergence.

The aircraft preferably includes a further wing portion, a further intermediate portion, and further propulsion jet outlet means, arranged to the other side of the body portion.

Conveniently, the or each propulsion jet outlet means is swivellable to a position in which the propulsion fluid exhausting therethrough is directed generally downwardly, to generate a lift component.

Advantageously, the or each propulsion outlet means, when arranged to exhaust the propulsion fluid rearwardly is of substantially the same external cross-sectional shape as that of the region of maximum divergence of the associated intermediate portion.

Conveniently, a forward region of each intermediate portion forms a strake region, and the upper and lower surfaces of each intermediate portion are of concave form adjacent the region of maximum divergence.

Preferably, each of the axes about which each propulsion jet outlet means is swivellable lie near a vertical plane containing the centre of gravity of an aircraft.

Preferably, each jet outlet aperture lies adjacent or rearward of the trailing edge of the wing portion.

In order to define generally smooth upper and lower surfaces and thus to reduce the aerodynamic drag, movable surface means may be provided between the upper and the lower surfaces of each propulsion jet outlet means, and the associated upper and lower surfaces of the intermediate portion.

According to another aspect of this invention, there is provided propulsion jet outlet means as hereinbefore defined.

Further aspects will become apparent from the following exemplary description, reference being made to the accompanying drawings, in which:

FIG. 1 is a general perspective view of an aircraft incorporating features of this invention;

FIG. 2 is a view, on an enlarged scale, of part of the aircraft of FIG. 1;

Figure 3:
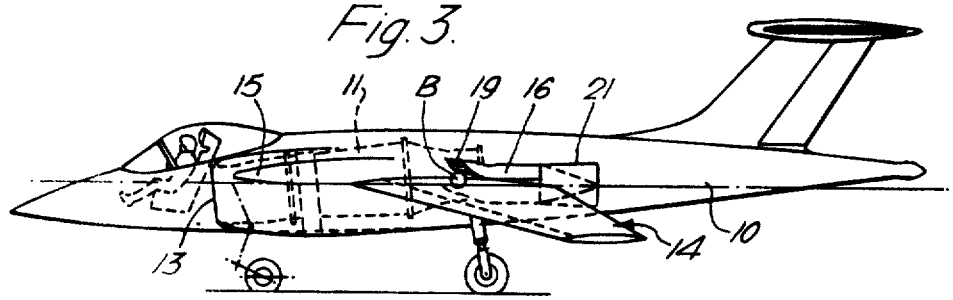
FIG. 3 is a detailed side view of the aircraft of FIG. 1.
Figure 4:
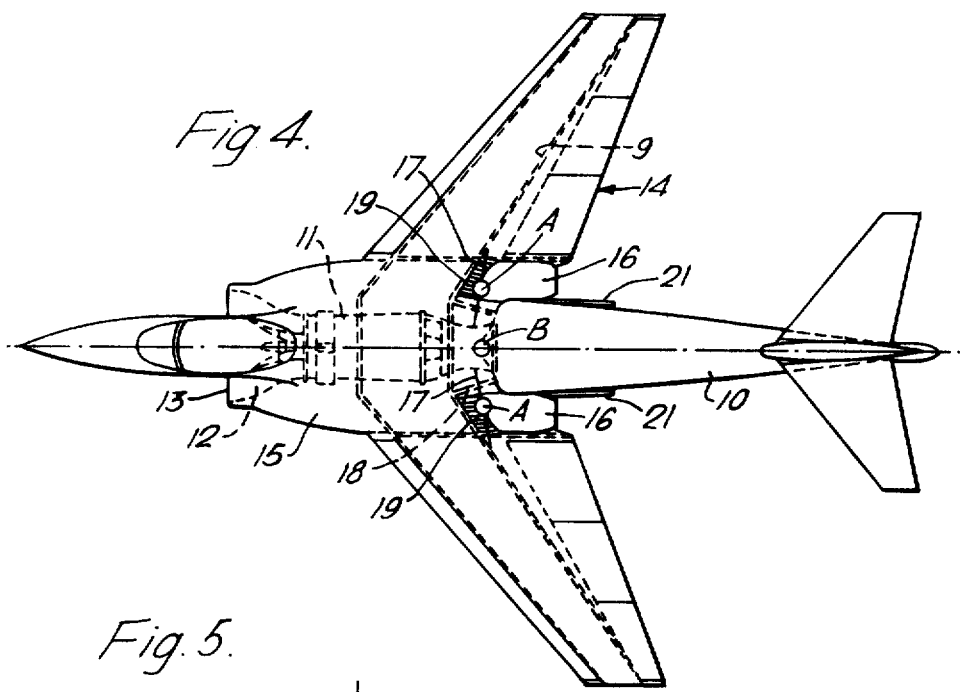
FIG. 4 is a detailed plan view of the aircraft of FIG. 1.
Figure 5:
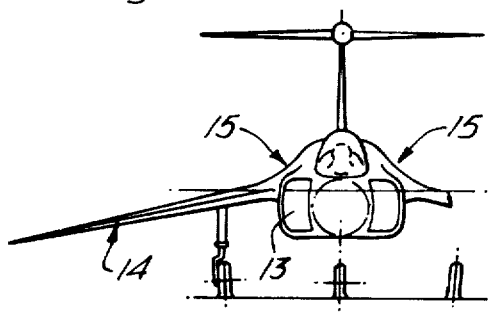
FIG. 5 is a detailed front view of the aircraft of FIG. 1.

Referring initially to the Figures, there is shown an embodiment of aircraft incorporating various features of this invention in which the propulsion jet outlet means are mounted for turning movement with respect to the aircraft body so that the propulsive thrust generated may be directed either rearwardly for propulsion purposes, or downwardly for lift purposes. The aircraft is therefore of the VSTOL type.

The aircraft comprises an aircraft body 10 including a powerplant 11 housed within the body. The powerplant receives air through a bifurcated duct 12 each limb of which is in flow connection with an intake 13, one positioned to either side of a forward portion of the aircraft body 10. A pair of wings 14 are attached one to each side of the aircraft body 10 and merge with the body at an intermediate portion 15.

Each intermediate portion 15 is defined by upper and lower concave surfaces which are shaped to induce lift as for a wing, that is to say they define an aerofoil longitudinal section, and diverge rearwardly from the leading edge of the intermediate portion to a maximum thickness (typically at 40% Chord). The aircraft includes a skeletal structure 9 which is the main wing load-bearing structure of the aircraft and extends within each wing generally transversely of the body. The rearward region of each (nominal) intermediate portion 15 aft of the transverse structure 9 is cut away.

Both intermediate portions 15 extend well ahead of the wings 14 alongside the fuselage to form a strake or leading edge root extension.

Figure 6:
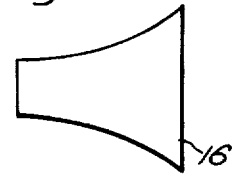
FIG. 6 shows a typical cross-section of a propulsion jet outlet means for the aircraft of FIG. 1.

A pair of propulsion jet outlet means, or nozzles 16, each comprising a duct and an outlet aperture, are mounted one to each side of the aircraft body 10, each in the cut-away region of the intermediate portion 15. The chordwise external cross-sectional shape of each duct is similar to that of the part of the intermediate portion 15 immediately forward of the nozzle, as shown in FIG. 6, and the cross-section of the portion of the duct in the cut-away region is substantially that of the intermediate portion 15 at its maximum.

Upper and lower finger plates or hinged doors 19 extend between the rearmost portion of the intermediate portion 15 and the foremost portion of the nozzle so that the nozzle, finger plates, and intermediate portion together define a section having substantially continuous upper and lower surface profiles in the fore and aft thrust vectored condition. The duct therefore extends rearwardly within a projection of the transverse cross-section of the portion of maximum thickness of the intermediate portion, and the amount of drag attributable to each nozzle is low when the aircraft is in normal flight.

Each nozzle 16 is mounted for rotation with respect to the aircraft body 10 about an axis 17, by means of a bearing 18 within the aircraft body. The bearings 18 are provided one on each leg respectively of a bifurcated or "trouser" chamber mounted on the aft portion of the powerplant 11 which chamber receives the propulsion gases generated by the powerplant 11.

Turning drive means (not shown) are provided to effect movement of the nozzles 16, about their associated axes 17, either in unison, or differentially.

A scrub-plate 21 is provided on each side of the aircraft body immediately aft of the nozzle 16, to prevent a reduction in jet efficiency and to protect that part of the aircraft body.

An important feature of this embodiment is that the centre of thrusts A of each of the nozzles 16, when in the vertical hover position, lie in or adjacent a vertical transverse plane containing the aft-most allowable centre of gravity B of the aircraft. Thus, when the nozzles 16 are oriented so that they direct the propulsion jets vertically downwardly to provide jet lift, there is little or no pitch moment imparted to the aircraft.

Whilst in the above-described embodiment, the nozzles 16 are mounted for pivotal movement; the invention also extends to arrangements in which the or each nozzle is fixed.

In addition, the invention also extends to configurations of aircraft other than that shown in FIG. 1; for example, to aircraft which, instead of having a single fuselage portion, have a twin boom arrangement.

We claim:
1. An aircraft having
 (i) a central fuselage portion
 (ii) a pair of wing portions projecting one from each side thereof
 (iii) a pair of intermediate portions each connecting a respective wing portion to a side of the fuselage portion
 (iv) a jet propulsion powerplant housed within said body portion for generating propulsion fluid
 (v) a pair of jet propulsion outlet means for receiving propulsion fluid from said powerplant and for exhausting it through respective outlet apertures,
each intermediate portion being of generally aerofoil longitudinal section and formed of upper and lower surfaces each concave with respect to respective generally longitudinal axes so as to blend smoothly with the wing and the fuselage portion, the upper and lower surfaces diverging rearwardly from a leading edge region to a region of maximum thickness, each jet propulsion outlet means being arranged rearwardly of a respective intermediate portion adjacent and between said fuselage portion and the rearward region of the associated wing portion and being shaped to lie substantially within a rearward projection of the region of maximum thickness of the intermediate region.

2. An aircraft of at least one of the jet propelled vertical and short take-off type, having
 (i) a body portion,
 (ii) a wing portion having a forward region and a rearward region
 (iii) an intermediate wing root portion connecting the forward region of the wing portion to the body portion
 (iv) a jet propulsion powerplant housed within said body portion for generating propulsive fluid
 (v) jet propulsion outlet means for receiving propulsion fluid from said powerplant and for exhausting it through an outlet aperture, and being movable between a position in which fluid is exhausted rearwardly, and a position in which fluid is exhausted downwardly.
said jet propulsion outlet means being arranged rearwardly of said intermediate wing root portion and flanked on one side by the rearward region of the wing portion and on the other side by said body portion, said intermediate wing root portion diminishing in thickness outboard of said body portion and blending smoothly with said wing portion and said body portion and being formed with upper and lower surfaces which diverge rearwardly from a leading edge region to a region of maximum thickness, said jet propulsion outlet means being shaped to lie substantially within a rearward projection of said region of maximum thickness of said intermediate portion.

3. An aircraft as claimed in claim 2, which includes a further wing portion, a further intermediate portion, and further propulsion jet outlet means, arranged to the other side of the body portion.

4. An aircraft as claimed in claim 3, wherein each propulsion jet outlet means is swivellable to a position in which the propulsion fluid exhausting therethrough is directed generally downwardly.

5. An aircraft as claimed in claim 2, 3 or 4, wherein each propulsion outlet means, when arranged to exhaust the propulsion fluid rearwardly, is of substantially the same external cross-sectional shape as that of the region of maximum divergence of the associated intermediate portion.

6. An aircraft as claimed in claim 2, 3 or 4, wherein a forward region of each intermediate portion forms a strake region.

7. An aircraft as claimed in claim 2, 3 or 4, wherein the upper and lower surfaces of each intermediate portion are generally concave with respect to respective generally longitudinal axes adjacent the region of maximum divergence.

8. An aircraft as claimed in claim 2, 3 or 4, wherein each jet outlet aperture lies adjacent of the trailing edge of the wing portion.

9. An aircraft as claimed in claim 2, 3 or 4, wherein movable surface means are provided between the upper and the lower surfaces of each propulsion jet outlet means and the associated upper and lower surfaces of the intermediate portion, thereby to define generally smooth upper and lower combined surfaces.

10. An aircraft as claimed in claim 4, wherein each of the axes about which each propulsion jet outlet means is swivellable lie near a vertical plane containing the center of gravity of an aircraft.

* * * * *